US010914865B1

(12) United States Patent
Fendell (10) Patent No.: US 10,914,865 B1
(45) Date of Patent: Feb. 9, 2021

(54) UAVS FOR MONITORING THE INTENSIFICATION OF TROPICAL CYCLONES

(71) Applicant: NORTHROP GRUMMAN SYSTEMS CORPORATION, Falls Church, VA (US)

(72) Inventor: Francis E. Fendell, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/852,947

(22) Filed: Apr. 20, 2020

(51) Int. Cl.
*G01W 1/08* (2006.01)
*G01W 1/02* (2006.01)
*G05D 1/00* (2006.01)
*B64C 39/02* (2006.01)

(52) U.S. Cl.
CPC ............ *G01W 1/08* (2013.01); *B64C 39/024* (2013.01); *G01W 1/02* (2013.01); *G05D 1/0094* (2013.01); *B64C 2201/125* (2013.01); *B64C 2201/127* (2013.01)

(58) Field of Classification Search
USPC ...................................................... 73/170.28
See application file for complete search history.

(56) References Cited

U.S. PATENT DOCUMENTS

| | | |
|---|---|---|
| 5,441,200 A | 8/1995 | Rovella, II |
| 8,210,467 B2 * | 7/2012 | Hubbell ................. G01W 1/08 244/13 |
| 8,903,571 B2 | 12/2014 | Kirk |
| 9,804,293 B1 * | 10/2017 | Fendell .................. G01W 1/06 |
| 9,977,963 B1 * | 5/2018 | Fendell ................ G05D 1/0011 |
| 2006/0201547 A1 * | 9/2006 | Rogers ................... B64G 1/446 136/201 |

(Continued)

OTHER PUBLICATIONS

Solomon, David L. et al. "Tropopause-Penetrating Convection from Three-Dimensional Gridded NEXRAD Data" Journal of Applied Meteorology and Climatology, vol. 55, Feb. 2016, pp. 465-478.

(Continued)

*Primary Examiner* — Clayton E. LaBalle
*Assistant Examiner* — Warren K Fenwick
(74) *Attorney, Agent, or Firm* — John A. Miller; Shumaker, Loop & Kendrick, LLP (57) ABSTRACT

A system and method for monitoring the intensification and weakening of tropical cyclones, including tropical storms and hurricanes. The method includes flying a UAV above the tropical cyclone for an extended period of time and detecting transitions in structure. Intensification to hurricane stage is indicated by core structure transition of the tropical cyclone to include the presence of an eye within an eyewall. The UAV can be a Global Hawk aircraft and include a number of sensors and detectors, such as a camera for providing images of the tropical cyclone, an infrared detector for detecting temperature changes in the eye structure, a radar detector for detecting wind magnitude and direction in the tropical cyclone, dropsonde sensors for measuring temperature, pressure, humidity, and wind speed/direction in the tropical cyclone, etc. The UAV can relay the vortex parameter data in real time to a satellite for subsequent downlinking to receiving stations.

20 Claims, 3 Drawing Sheets

(56) References Cited

U.S. PATENT DOCUMENTS

| | | | |
|---|---|---|---|
| 2007/0158449 | A1 | 7/2007 | Hoffmann et al. |
| 2007/0158452 | A1 | 7/2007 | Hoffmann et al. |
| 2009/0326792 | A1 | 12/2009 | McGrath |
| 2010/0264230 | A1 | 10/2010 | Romanoff |
| 2011/0004368 | A1 | 1/2011 | Hubbell et al. |
| 2011/0131230 | A1 | 6/2011 | Nyman |
| 2015/0131079 | A1 | 5/2015 | Heinonen et al. |
| 2015/0296721 | A1 | 10/2015 | Bissell |
| 2016/0059962 | A1 | 3/2016 | Abuelsaad et al. |
| 2016/0106045 | A1 | 4/2016 | Liu |
| 2016/0247404 | A1* | 8/2016 | Srivastava ........... G08G 5/0091 |
| 2017/0299771 | A1 | 10/2017 | Fendell |

OTHER PUBLICATIONS

Fendell, Francis et al. "Towards Modular Analysis of Tropical-Cyclone Structure: The Boundary Layer" J. Fluid Mech. vol. 731, 2013, pp. 223-258.

Elston, Jack S. et al. The Tempest Unmanned Aircraft System for In Situ Observations of Tornadic Supercells: Design and VORTEX2 Flight Results, Journal of Field Robotics, (28)4, 2011, pp. 461-483.

Eheim, Christian et al. "Tornadochaser: A Remotely-Piloted UAV for In Situ Meteorological Measurements" American Institute of Aeronautics and Astronautics, May 2002, pp. 1-8.

Carrier, G. et al. "Self-Sustaining Intense Vortices" Physica D. 77, 1994, pp. 77-96.

Elston, Jack, et al. Design and Validation of a System for Targeted Observations of Tornadic Supercells Using Unmanned Aircraft Intelligent Robots and Systems (IROS), 2010 IEEE/RSJ International Conference on. IEEE, 2010, 6 pgs.

Darack, Ed, "UAVs: The New Frontier for Weather Research and Prediction" http://www.weatherwise.org/Archives/Back%20Issues/2012/March-April%202012/U/AVs-full.html, 7 pgs.

Frew, Eric W. et al. "Unmanned Aircraft Systems for Sampling Severe Local Storms and Related Phenomena" Robotics and Automation Magazine 19.1 (2012): 85-95, pp. 1-10.

English Abstract of Yang et al. (CN102938075), 20-20-2013.

Fischer et al. "The Rapid Intensification and Eyewall Replacement Cycles of Hurricane Irma (2017)." Monthly Weather Review vol. 148, pp. 981-1004.

Duan, Y. et al. "Landfalling Tropical Cyclone Research Project (LTCRP in China." BAMS, Dec. 2019, p. ES447-ES471.

Cione, Joseph J. "Eye of the Storm: Observing Hurricanes with a Small Unmanned Aircraft System." BAMS, Feb. 2020, E186-E205.

* cited by examiner

UAVS FOR MONITORING THE INTENSIFICATION OF TROPICAL CYCLONES

BACKGROUND

Field

This disclosure relates generally to a system and method for monitoring tropical storms and hurricanes and, more particularly, to a system and method for monitoring tropical storms and hurricanes using an unmanned aerial vehicle (UAV) flying above such a storm, where the UAV includes sensors for detecting, among other observables, a presence of an eye within an eyewall in the core of a storm. The UAV uses sensors to measure characteristics of the interface if there is an eye within an eyewall because predictions about the intensification or weakening of the storm can be made based on the measured properties.

Discussion

A tropical cyclone is a rapidly rotating tropospheric-vortex system characterized by low pressure at its center, especially near the Earth's surface, a closed low-level atmospheric circulation, organized convection, and a concentrated arrangement of thunderstorms that produce heavy rain. Depending on its geographic location and strength, a tropical cyclone is referred to as a hurricane, typhoon, tropical storm, cyclonic storm, tropical depression, or simply cyclone. In particular, a hurricane is an intense vortex that occurs in the Atlantic Ocean or central/eastern Pacific Ocean, a typhoon is its counterpart in the northwestern Pacific Ocean, and a cyclone is its counterpart in the south Pacific or Indian Ocean. As commonly described in the United States, a tropical storm is a tropical cyclone of lesser intensity than a hurricane, and a tropical depression is a tropical cyclone of lesser intensity than a tropical storm. Throughout the following disclosure, the general term tropical cyclone will be used to describe any such organized tropical system, and more specific terms such as tropical storm and hurricane will be used as appropriate.

While their weaker antecedents may sometimes be traced to over-continent origins, tropical cyclones typically form over broad expanses of relatively warm water. They derive their formative energy through the condensation of water vapor, evaporated from the ocean surface, in clouds with resulting rainout when the moist air rises in the atmosphere and cools by expansion to saturation. This energy source differs from that of mid-latitude cyclonic storms, such as "nor'easters" and European windstorms, which are engendered in ambient conditions characterized by horizontal temperature contrasts. Owing to their large lateral scale, the strong rotating winds of a tropical cyclone are a result of the conservation of angular momentum acting on the motion imparted by the Earth's rotation: air at different latitudes travels circumferentially at different speeds, and can organize to a vortex if drawn inwards under convectively induced advection, toward a centrally sited, fairly vertical axis of rotation. These requisite tropical cyclone-formation conditions (and others not discussed) hold in the intermittently strongly convectively unstable atmosphere at low latitudes in the late summer and fall in all tropical-ocean basins (other than the South Atlantic, which very rarely experiences tropical cyclones). However, observationally, the spawning conditions do not arise at very low latitudes, as tropical cyclones rarely form within 5° of the equator. Tropical cyclones are typically between 100 and 2,000 km (62 and 1,243 miles) in diameter.

Thus, tropical refers to the geographical origin of these systems, which become organized almost exclusively over tropical seas. Cyclone refers to their cyclonic nature, with wind blowing counterclockwise (as viewed from above) in the Northern Hemisphere and clockwise in the Southern Hemisphere. Our observation of the circulation incorporates the Coriolis effect arising in a frame of reference rotating with the Earth.

In addition to strong winds and rain, tropical cyclones are capable of generating high waves, damaging storm surge, and moderately strong tornadoes. They typically weaken on the scale of 8-12 hours over land, more quickly from a geographically induced rainout over mountainous terrain. For these reasons, coastal regions are particularly vulnerable to damage from a tropical cyclone as compared to inland regions, especially if landfall coincides with high tide. Heavy rains, nevertheless, can cause significant flooding inland, and storm surges can produce extensive coastal flooding up to 40 km (25 mi) from the coastline for gently inclined coastal bathymetry and orography.

Intensity is formally defined by the U.S. National Oceanic and Atmospheric Administration (NOAA) as the peak one-minute-average wind speed at 10-meter altitude above sea level; less meticulously, intensity is the peak sustained low-level wind anywhere in the vortex. While other tropical cyclone parameters are important—such as vortex size, lifespan, propensity for storm surge, precipitation and tornadogenesis—current intensity has been traditionally accepted as the single most useful parameter for characterizing current vortex strength. In fact, intensity is rarely known better than to within 5-10%, if even that well, because comprehensive monitoring of so violent and large a vortex as a tropical cyclone is challenging. Consistent with this uncertainty, intensity is traditionally described with the aid of binning: if the peak sustained low-level wind speed exceeds 17 m/s (38 mph), a depression has evolved to a tropical storm; at 33 m/s, a tropical storm has evolved to a category 1 hurricane; 42 m/s is the threshold for a category 2 hurricane; 49 m/s is the threshold for a category 3 hurricane; 58 m/s is the threshold for a category 4 hurricane; and 70 m/s (156 mph) is the threshold for a category 5 hurricane.

Because of the destructive nature of hurricanes, especially major (cat. 3-5) hurricanes, it is of great societal interest to predict their path and intensity in order to provide advance warning to those in harm's way, while minimizing false alarms. The path of a hurricane is dictated primarily by ambient winds and pressure fields. Because these parameters are relatively accessible with the aid of satellite monitoring, computerized global forecast systems, introduction of ensembles in forecasting, etc., hurricane path prediction has improved markedly over the past 20-30 years. However, during this same timeframe, the accuracy of prediction of intensification or weakening of hurricanes has seen little improvement, especially for more challenging scenarios requiring prognostic skill. This is due at least in part to an incomplete understanding among many researchers as to how and why tropical cyclones intensify or weaken. Efforts to improve understanding of internal tropical cyclone behavior through detailed highly-inclusive local-area modeling of the vortices have not led to significantly improved results and may even contribute to the stagnation of progress, as the heavy allocation of available resources to real-time use of these models invariably results in spatially coarse resolution and difficulty with initiation of a simulation, and the models may suffer even from incorporation of flawed physical concepts.

In most parts of the world, satellite images can be provided, and images from sun synchronous and geosynchronous constellations are useful in determining location and size of tropical cyclones and of weaker tropical systems. Radar data, where available, can provide additional information about a vortex's winds and precipitation. However, the availability of radar data depends on a vortex's proximity to a radar antenna, and is therefore often less likely available for vortices either away from coastlines or along remote coastlines.

In addition to satellite imagery and radar scanning, hurricane monitoring in recent decades—particularly off both coasts of the United States—has emphasized flying "hurricane hunter" aircraft directly into a hurricane at mid tropospheric altitude (~3 km) and making as many measurements and human observations as possible during each pass through the vortex. Because of widespread belief that a key to hurricane behavior lies in the "boundary layer" (the part of the vortex below about 1000 m above sea level, where the vortex interacts strongly with the underlying sea water), aircraft are typically flown through the hurricane for data gathering at as low an altitude as safety allows. These data are typically fed into a large, computationally-intensive meteorological model, as discussed above, in an attempt to simulate in detail the processes within and surrounding the vortex and to predict what the vortex will do next. In addition to the complexities of assimilating the data in this type of model, this traditional approach is confounded by the fact that human-piloted aircraft can spend only a brief amount of time monitoring a tropical cyclone, and many changes in the vortex may happen while no plane is monitoring. As mentioned above, this over-matched attempt at comprehensive monitoring has yielded limited improvement in accuracy of intensification predictions for tropical cyclones. Furthermore, in many parts of the globe, reconnaissance and surveillance flights by on-board-piloted aircraft are not routinely undertaken.

Because of the vast destructive potential of major hurricanes, and the lack of improvement in hurricane intensification prediction using existing traditional methods, a new technique is needed which provides improved operational monitoring of tropical cyclone intensification and weakening through whatever more organized stages a particular tropical cyclone may achieve in its life. The often nonmonotonic progression may evolve from tropical depression to tropical storm to hurricane to major hurricane, and possibly back again as the mode of demise of the vortex.

SUMMARY

The present disclosure describes a system and method for monitoring the intensification and weakening of tropical cyclones—including tropical storms and hurricanes. The method includes flying a UAV above the tropical cyclone for an extended period of time and detecting transitions in structure of the vortex. Intensification to hurricane stage is indicated by transition in the core structure of the tropical cyclone to include the presence of an eye within an eyewall. When an eye within an eyewall is present, detailed measurements of the eye and eyewall are made, and the measured properties of the eye and eyewall, along with other measurement data, are used to estimate intensity and anticipate an intensity trend. The UAV can be a Global Hawk aircraft and can include a number of sensors and detectors, such as an imaging camera for providing images of the tropical cyclone, an infrared detector for detecting changes in temperature with height in the eye domain, a radar detector for detecting wind magnitude and direction in the tropical cyclone, dropsonde sensors for measuring temperature, pressure, relative humidity, wind speed and wind direction in the tropical cyclone, etc. The UAV can relay the vortex parameter data to a satellite or other craft for subsequent downlinking to receiving stations.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a system and method for monitoring the of intensity and intensity trend of tropical cyclones using a UAV is merely exemplary in nature, and is in no way intended to limit the disclosure or its applications or uses.

As will be discussed in detail below, the present disclosure proposes using an unmanned aerial vehicle (UAV), such as the Global Hawk, that flies above a tropical cyclone and translates with it to detect structural changes that indicate intensification to a hurricane or a major hurricane, wherein the tropical cyclone transitions into a configuration including an eye and eyewall, or undergoes the withdrawal of at least some of those features. The UAV provides a high-altitude, long-endurance (HALE) vehicle that allows sustained real-time monitoring of the tropical cyclone's intensification and weakening through, for the Global Hawk, the exceptional combination of fast-flying, high-flying, long-mission, large-payload, large-on-board-power-supply, real-time-data-readout, and in-flight-mission-re-direction capabilities, along with multiple pressurized and unpressurized bays, pods, and hard points to accommodate payloads that do not interfere with one another.

The UAV employs various remote and in situ detectors and sensors to detect structural and thermofluid-dynamic parameters in a tropical cyclone, in particular, within a compressionally heated, relatively hydrometeor-free vertical vault (the eye) inserted by down-flow at and near the center of the tropical cyclone. These detectors and sensors detect the relatively calm center of the tropical cyclone, indicating the presence of an eye wherein relatively little wind or rain is occurring, and which is surrounded by a violent area with a strong rotating updraft (the eyewall), with deep cloudiness and torrential rainfall. The sensors and detectors can also detect a depression in the cloud deck associated with an eye.

The surrounding annulus with intense convection and rotation includes cumulonimbi with tops that may overshoot the cloud deck. The downward-looking perspective provided by the UAV is in contrast to the upward-looking perspective traditionally employed by low-altitude flights by manned aircraft or UAVs.

The ultimate objective of the tropical cyclone monitoring discussed herein is to anticipate (1) which tropical storm will intensify to become a hurricane (statistically, about one-half do), and (2) which hurricane will further intensify to become a major hurricane (statistically, about one-half to one-third do). The key to these intensifications is the insertion of an eye-within-an-eyewall structure for a tropical storm that evolves to a hurricane, and the subsequent extension seaward, drying, and lateral contraction of that eye for a hurricane that evolves to a major hurricane. A key observable is delineation of the eye/eyewall interface as a function of both radial displacement from the axis of rotation and altitude above sea level.

Figure 1:
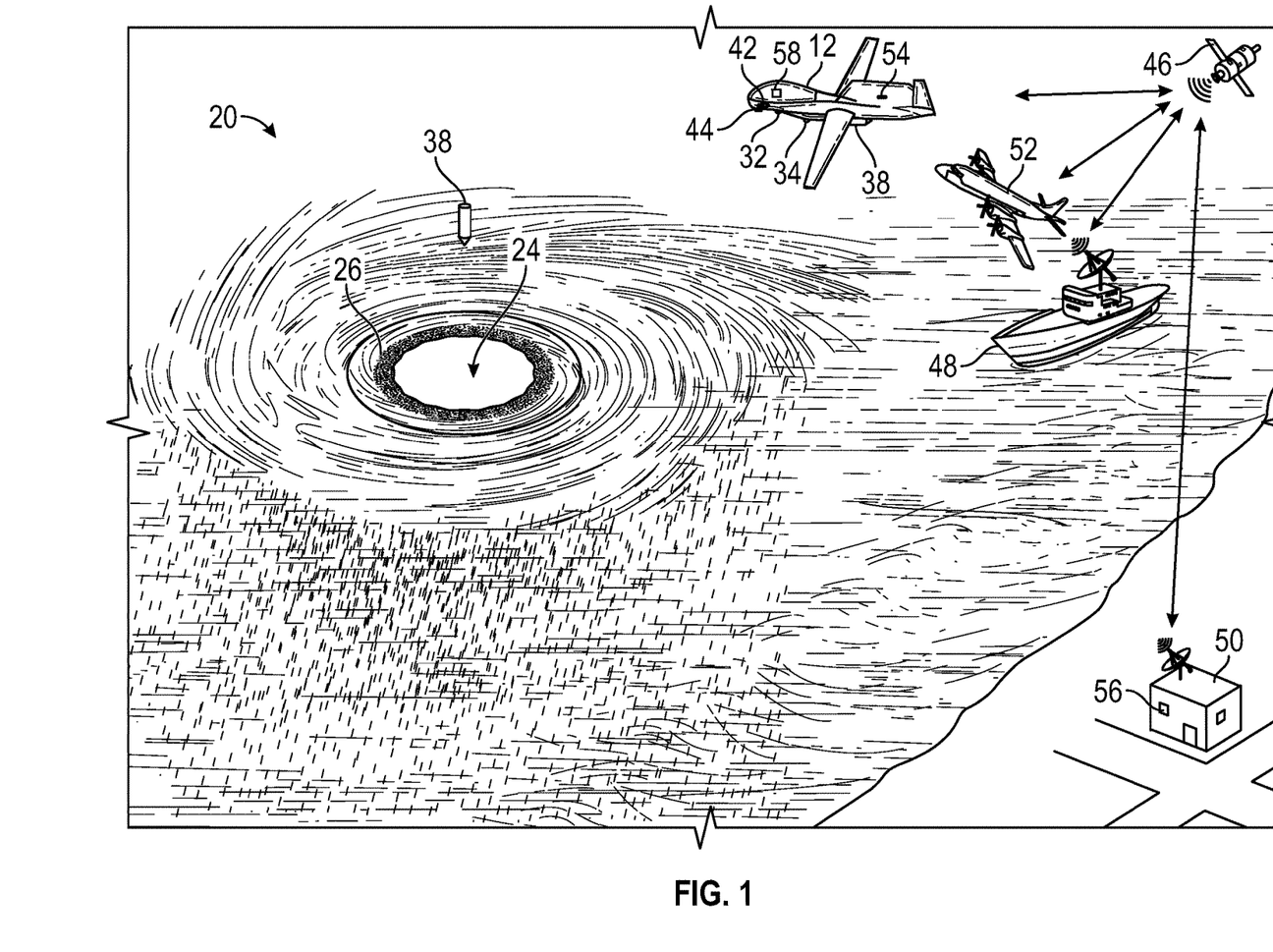
FIG. 1 is an illustration of a UAV flying above a tropical cyclone that has achieved hurricane stage, where the UAV includes various sensors for detecting properties of the vortex—particularly the eye and the eyewall.

FIG. 1 is an illustration showing a Global Hawk UAV aircraft 12 flying above a hurricane 20. As discussed above, the present disclosure is designed for monitoring of tropical cyclones of depression or greater intensity—particularly tropical storms and hurricanes, including major hurricanes. Thus, the reference to the "hurricane 20" in FIG. 1 is not meant to be limiting, but rather to be illustrative, in that the hurricane 20 is depicted with an eye/eyewall structure that would not be present in a tropical storm or a tropical depression. It is the detection of the presence or absence, appearance and disappearance of this eye/eyewall, along with the structural monitoring thereof, that distinguish the present disclosure from previous tropical cyclone monitoring methods.

A tropical cyclone that has achieved the type of well-formed eye/eyewall as shown for the hurricane 20 of FIG. 1 would likely have achieved peak sustained low-level wind speed necessary and sufficient to be classified as a category 3-5 hurricane. The hurricane 20 has a center eye 24 surrounded by a complete, annular eyewall 26, in this idealized, axisymmetric depiction (a subject to be addressed again later). The eye 24 of the hurricane 20 may extend from upper altitudes of the troposphere (i.e., the tropopause) all the way down to the ocean surface, or the eye may extend from the top of the vortex at the tropopause downward only part of the distance to the ocean surface. Although the eye 24 may have a cylindrical shape, the diameter of the eye 24 is almost invariably greatest at the top and tapers—sometimes gradually and sometimes substantially—to smaller diameter towards the base of the vortex. The most violent winds in the hurricane 20 typically occur in the annular eyewall 26. Measurement of the properties of the eye 24 and the eyewall 26—discussed in detail below—enable accurate and timely evaluation of the intensification or weakening (or quasi-steady persistence) of the hurricane 20.

The measurements described herein are best taken from an altitude above the top of the hurricane 20, and yet below any overlying layer of clouds that may exist. In one non-limiting example, the aircraft may desirably be positioned in an altitude ranging from 50,000-60,000 ft. Because the eye 24 of the hurricane 20 may be as small as a few km in diameter, it may not be possible for the aircraft 12 to remain directly over the eye 24 at all times. However, the maneuverability of the Global Hawk UAV aircraft 12 enables it to circle around and translate with the hurricane 20 for optimum continuous measurement. Furthermore, some measurements and imaging may be aided by differing view perspectives. For these reasons, the aircraft 12 will likely be flown directly over the eye 24 during parts of its mission, and offset from over the top of the eye 24 during parts of its mission. Various flight patterns, adopted for transects of the vortex during manned reconnaissance missions at mid tropospheric altitudes, such as figure-eight, oval, serpentine and/or spiral patterns, may not achieve the best imaging and measurements afforded by HALE (overview) monitoring of the core of the vortex.

The Global Hawk aircraft 12 includes a number of sensors, detectors, cameras, etc. that are able to detect various atmospheric conditions and events, such as eye insertion or withdrawal, pressure, humidity, temperature, wind speed, wind direction, etc., so as to collect the most possible data about the core of the hurricane 20, including (and giving priority to) the presence or absence of the eye 24 and the eyewall 26. For example, the aircraft 12 may include a camera 32 that is able to take optical images of the hurricane 20, which images may provide information showing various things, such as presence of the eye 24, diameter of the eye 24, the distance downward to which the eye 24 extends, the altitude of the top of the eyewall 26, etc.

The aircraft 12 may also include an infrared detector 34 that detects changes in temperature with altitude in relatively cloud-free portions of the hurricane, such as the eye 24. These temperature profiles can provide valuable insight into the thermo-fluid dynamic activity (such as compressional heating) which is taking place within the eye 24. The images and data provided from the camera 32 and the infrared detector 34 provide finer spatial resolution than some other types of sensors such as microwave, while each sensor type generally detects some storm features (e.g., visual appearance, temperature profiles, humidity data, presence of hydrometers, etc.), or has access to portions of the vortex, better than others.

The aircraft 12 may also include a number of deployable sensors 38 that can be released on a variable schedule from the aircraft 12, where one of the deployable sensors 38 is shown on the aircraft 12 and another is shown in a released state descending into the eye 24. As is known in the art, the deployable sensors 38 are expendable sensors and are deployable in the air from the aircraft 12 and are designed to provide in situ measurement of meteorological data—including air temperature, air pressure, relative humidity, wind direction, etc. The deployable sensors 38 may include dropsondes which descend from the release altitude all the way to the ocean surface. The deployable sensors 38 may also include constant-altitude balloons.

Dropsondes collect meteorological data during decent, and transmit that data back to the aircraft 12 as the dropsonde descends. The dropsonde sensors may be able to detect the radial/axial circulation of air within the eye 24, where air at and near the center of the eye 24 may be flowing downward, and air in the eye 24 adjacent to the eyewall 26 may be flowing upward under shearing. (The associated radial/axial circulation within the eye 24 permits sustaining the relative warmth of the eye 24, and possible mass/momentum/heat interchange between near-interface content of the eye and eyewall). The dropsonde sensors may also be able to measure water temperature of the ocean surface where it lands, and transmit this information back to the aircraft 12. The dropsonde deployable sensor 38 also preferably includes position and altitude sensors, such as a GPS sensor and an altimeter, such that all of the atmospheric and other data which are collected and transmitted can be indexed by location and altitude.

The capability of the UAV aircraft 12 related to the deployable sensors 38 may also include the release, and subsequent monitoring/tracking, of constant-altitude balloons into an eye 24. Constant-altitude balloons released from above the storm offer the capability to monitor conditions at a particular location in the storm over an extended time period. The issues under investigation are the source of the air in the eye 24 (whether drawn from the lower stratosphere or detrained from the upper eyewall 26), and the mass/momentum/heat exchange between the outer edge of the eye 24 and the inner edge of the eyewall 26 (usually envisioned to be entrainment from the eye 24 to the eyewall 26 at lower altitudes, and detrainment from the upper eyewall 26 to the eye 24). Classically, drifting lightweight inexpensive balloons designed to follow horizontal (but not vertical) air motion very accurately have an inextensible shell; such rigid or semi-rigid balloons float on a constant-density surface, which is approximately a constant-altitude surface in the eye 24, selected by the mixture of gasses such as helium and air in the nearly constant volume. One problem with such balloons in a humid atmosphere near the sea surface is the additional mass loading that can arise with condensation, the collection of moisture typically changing from daytime to nighttime; this problem is minimized in the relatively dry eye 24. Still, there is solar heating during the day and infrared-radiation cooling at night, so there is a diurnal change in altitude. Accordingly, more sophisticated versions of these balloons have a ballast to adjust the buoyancy by injecting or removing air when the balloon travels vertically outside a barometric pressure range set prior to release; typically, such balloons are constructed of a flexible material so the volume may change. The GPS location, barometric pressure, temperature, and relative humidity may be transmitted by transponder to the UAV aircraft 12 from which the balloon was launched. In fact, two-way communication could allow interactive control of the balloon operating parameters. Again, a drone or other aircraft limited to altitudes under one kilometer (roughly 5000 ft), as proposed by others, is less suitable for the launching and sustained monitoring of constant-altitude balloons.

The aircraft 12 may also include a radar detector 42 for detecting hydrometeors (particles of liquid and/or solid water substance in the air) from which may be inferred variations in air mass movement, such as wind direction and speed, especially in the eyewall 26. The radar detector 42 may also be able to detect structural properties—shape and size—of the annular eyewall 26, where these properties provide insight into vortex intensification or weakening. However, it is cautioned that radar returns from random short-duration, convective, vertically orientated "bursts" near the inner edge of the eyewall (with associated vigorous updrafts and downdrafts) should not be confounded with the longer-term flow pattern of interest. Overshooting tops of these bursts may inject hydrometeors into the upper eye. These hydrometeors then circulate in the eye 24 to mitigate some of the compressional heating in the eye 24.

The aircraft 12 may also include passive microwave sensors 44 for detecting temperature and humidity profiles within the core of the hurricane 20.

Data, images and other information collected by the various detectors and sensors on the aircraft 12 as discussed herein can be sent to one or more satellites 46, where the data can be processed and sent to other satellites, a sea vessel 48, a receiving station 50 on the ground, other aircraft 52, etc. Ultimately, the data from the aircraft 12 are provided to a storm forecast center—typically housed at a facility such as the receiving station 50.

The Northrop Grumman Global Hawk is a high-altitude long-endurance (HALE) UAV ideally suited to serve as the aircraft 12. The Global Hawk cruises at a speed of around 350 miles per hour (mph), and can accommodate a payload of 2000 lb. or more. The high speed of the Global Hawk translates to short times enroute from airfield to tropical cyclone and return, and thus more time spent "on station" productively monitoring the vortex. The high-altitude flight capability of the Global Hawk means that any intervening weather will not impede its access to the tropical cyclone location. The large payload means that the Global Hawk can carry many of the deployable sensors 38 and deploy them into the hurricane 20. In fact, the Global Hawk has sufficient payload capability and hard mounting points to carry and deploy many dozens of the deployable sensors 38. The Global Hawk may have sufficient on-board capability to receive position and in situ data from multiple dropsondes deployed in rapid succession as they are in descent simultaneously, and also handle the deployment of constant-altitude balloons.

Long endurance is another feature of the Global Hawk which meets the needs of tropical cyclone monitoring. The Global Hawk has a flight endurance of 30 hours or more. Given the high flight speed of the Global Hawk which enables rapid arrival on target, the long flight endurance equates to a time on target of 20 hours, or more. These features allow a tropical cyclone, which can persist for days or even weeks, to be continuously monitored by just two Global Hawks, where there is ample time to refuel, perform maintenance, and restock one unit while the other unit is in flight. The long-duration-mission capability of the Global Hawk allows the aircraft 12 to provide continuous measurement and image data—not just intermittent snapshots as is traditionally done—and therefore the Global Hawk aircraft 12 is less apt to miss changes in structure and intensity of the hurricane 20 when they occur. It is reiterated that tropical storms do not necessarily strengthen monotonically to peak hurricane intensity and then weaken monotonically to a depression, but rather may repeatedly intensify and weaken among the categories. The ability to continuously monitor the tropical cyclone and compare current measurements to previous measurements is crucial. Initial eye insertion may occur relatively rapidly, within a small fraction of an hour.

The aircraft 12 further includes automated flight controls, two-way radio systems 54 for communications with a ground-based remote controller 56 and with other data receivers (the satellite 46, etc.), and at least one processor 58 configurable with instructions such as flight speed, altitude and heading of flight, specific sensor measurements to be taken, and time/location to deploy the deployable sensors 38, etc. Mission instructions may be pre-programmed before take-off of the aircraft 12, and also updated or amended during flight via commands from the ground-based remote controller 56. Prediction of the path, intensity, and behavior of a tropical cyclone is often inaccurate at the present state of the art, and capacity to respond during a mission to surprises, especially relatively rapid surprises, is highly advantageous.

The deployment of the aircraft 12 to the site of the hurricane 20 for an extended-length mission observing the hurricane 20 and providing image data and measurement data can be of valuable assistance in monitoring storm intensification or weakening. However, the most value will be realized only if the aircraft 12 is used to look for and measure the "right things". These "right things" particularly include the structure of the core of the cyclone, including the full vertical and radial extent of the eye 24 and the eyewall 26, which can be determined only from above. The full advantage of this has been unavailable to, or overlooked by, previously-used cyclone observing techniques.

Figure 2:
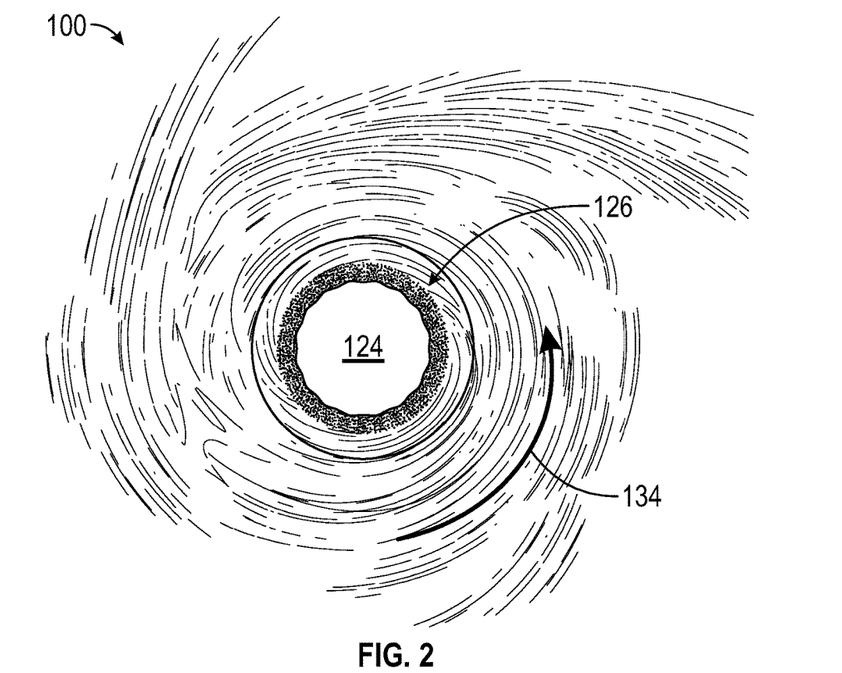
FIG. 2 is a top view illustration of a hurricane showing elements and features of the hurricane which can be detected by the UAV of FIG. 1 and which can be used for monitoring of intensity and intensity trend.
Figure 3:
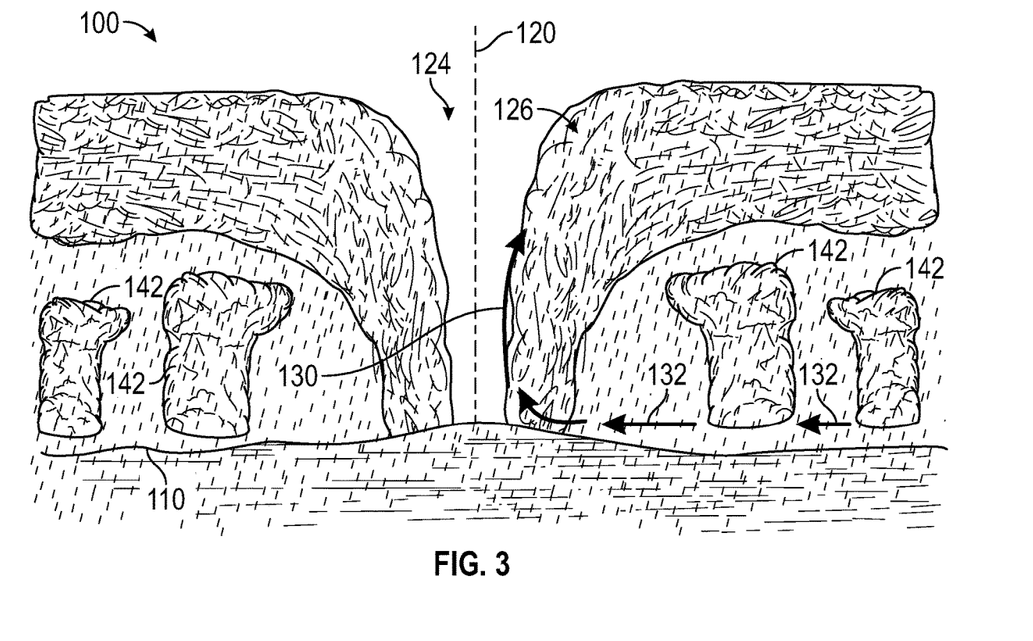
FIG. 3 is a cross-sectional elevation-view illustration of the hurricane of FIG. 2.

FIG. 2 is a top view illustration, and FIG. 3 is a cross-sectional elevation view illustration, of a hurricane 100 showing elements and features of the hurricane 100 which can be detected by the UAV aircraft 12 of FIG. 1, and which can be used for intensification monitoring. The depiction of the hurricane 100 is an idealized, axisymmetric approximation of a real world hurricane. The hurricane 100 has a fully closed eyewall, and is a tropical cyclone which has reached a high level of intensity. Some of the features of the hurricane 100 are not present for a cyclone at a lower level of intensity, such as a tropical storm, as discussed below.

Again it is emphasized that the term "hurricane" is used in discussion of FIGS. 2-3 because the vortex depicted in these figures includes all of the features of a fully-developed high-intensity tropical cyclone (i.e., a hurricane, possibly a major hurricane), but the monitoring of the vortex for the presence/absence/extent of these features is applicable to any tropical cyclone including those well below hurricane levels of intensity.

The hurricane 100 is positioned over a surface 110 of the ocean. The hurricane 100 has a vertical axis of rotation 120, about which the vortex rotates. An eye 124 exists at, and in the near vicinity of, the axis 120, with the eye 124 being typified by relatively light winds and a paucity of clouds or rain. An eyewall 126 exists immediately outside of the eye 124, with the eyewall 126 containing the most violent winds and the heaviest precipitation of any location in the hurricane 100. The boundaries of the annular eyewall 126 (inner boundary with the eye 124, outer boundary with the bulk vortex) might conceivably assume many different shapes—including frustra of concentric right circular cylinders with parallel/vertical walls of fixed gap; concentric cones; or concentric horns, i.e., generally conical shapes except near the top where they flare outward as shown in FIG. 3. The lower altitude portion of the eyewall 126 is shown with a fairly constant thickness simply for illustration purposes, but particularly above mid-altitude the eyewall 126 may increase in thickness with increasing altitude, and the eyewall 126 typically has increasingly horizontal orientation at higher altitude. The shape and size of the eye 124 and of the eyewall 126 are significant to the level of intensity of the hurricane 100, as will be discussed further below.

For the purposes of physical and mathematical analysis, the hurricane 100 is comprised of several distinct modules, each with its own significant wind component(s)—including an eyewall updraft 130, a near-surface-inflow layer (frictional boundary layer) 132 and a primary vortex (or bulk vortex) 134. Spiral bands observable in the primary vortex contain cumulus/stratiform clouds 142. The clouds in the rainbands typically increase in height with decreasing distance from the axis 120. The spiral bands mark precipitation (primarily rain) from the cumulus/stratiform clouds 142, carried azimuthally by swirling wind, which has the direction of rotation of the vortex (counter-clockwise in the northern hemisphere, as viewed from above, and indicated in the primary vortex 134). The clouds and swirl, which diminish with distance from the axis 120, give the hurricane 100 the traditional swirled-pinwheel appearance as shown in FIG. 2. In the primary vortex, amid much ascent of moist air in short-lived cumuli and much descent of air with the condensate, there is a steady modest net downdrift of air to supply the boundary layer.

The horizontal and vertical dimensions of FIG. 3 are not shown to scale; the figure is (appreciably) exaggerated vertically, for illustration purposes. A large tropical cyclone, such as the hurricane 100, may have a radius of 1500 km (900 miles) from the axis 120 to the outer periphery of the outer bands, while the height of the vortex rarely much exceeds 15 km (about 9 miles, or 48,000 feet). Also, the low-level boundary-layer-furnished swirling influx (throughput) of the vortex ascends in the core, and is exhausted laterally outward, mostly at upper-tropospheric altitudes. Thus the throughput is returned to the ambient at the periphery of the vortex, after a once-through transit. Hence, over much of the lateral expanse of the vortex, higher-level layers of cirrus cloud exist above the lower levels of the hurricane 100, where these higher-level cirrus clouds obstruct observation of the lower-level hurricane 100 by satellite photography. Fortunately, many key observations involve the more accessible core of the vortex, and for sensing many atmospheric fields in the core, such as pressures and temperatures, the ideal altitude for the aircraft 12 to fly when monitoring the hurricane 100 is just above the top of the eyewall 126—or typically at an altitude of 50,000-60,000 feet.

Contrary to intuition, the more the eye/eyewall interface slopes radially outward with increasing altitude above sea level (i.e., the greater the "stadium effect" shown in FIG. 3), the more intense the tropical cyclone. This inclination allows more of the compressional heating in the eye 124 to overlie the annular eyewall 126, and to generate a lower pressure at the base of the eyewall 126, especially at the outer edge of the eyewall 126 at low altitude. (The fastest sustained low-altitude swirling in the vortex is observed to occur near the outer edge of the eyewall 126, but the lowest sea-level pressure need not, and observationally does not, occur there.) Without the overlying portion of the eye 124, the eyewall 126 has to rely entirely on the release of condensational heat to counter expansional cooling with increasing height, to lower density. Under conservation of axial momentum, such reliance entirely on the release of condensational heat produces sea-level pressure anomalies (deficits) from sea-level ambient pressure that are limited to a few tens of hectopascal (hPa) or millibars (mb). (The hPa is the international (SI) unit for measuring atmospheric pressure, where 1 hPa=100 Pascals=1 mb.)

A few tens of hPa lateral pressure deficit translate, under the equations for conservation of angular momentum and radial momentum, into the moderate swirling speeds of tropical depressions and tropical storms, which lack an eye. In a tropical cyclone with the density reduction by compressional heating afforded by the presence an eye, the sea-level anomalies (lateral pressure deficits) from sea-level ambient can exceed 100 hPa, and peak low-level sustained swirl speed can exceed 75 m/s. Thus it is the entire configuration of the eye/eyewall interface that is of significance, including the upper-tropospheric portion. For these reasons, it is imperative that the storm be viewed from the top down, as taught in the present disclosure. Other prior art practices and methods which fly through a storm, including the eye of a hurricane, at low altitudes (anything well below 50,000 ft) to make measurements and observations cannot detect the key features which portend vortex intensification or weakening.

Rather than simply deploying an aircraft to the hurricane 100 and attempting to measure every possible variable, the present disclosure proposes concentrating on the appearance, development, diminishment and disappearance of the eye 124 and/or the eyewall 126. It is believed that the configuration of the eye 124 and the eyewall 126, and what is happening within them, can provide the best indication of whether, in the near term, the vortex (the hurricane 100) is strengthening or weakening (or persisting about as it is), which is decision-assisting guidance that tropical cyclone forecasters and public safety officials particularly seek. (The predictability horizon, i.e., time into the future, for which intensity forecast is physically accessible for an atmospheric system that is intensely convective on the 1-km scale or less, may be far shorter than what is commonly undertaken.) As mentioned previously, an eye enveloped by an eyewall may not be present in some tropical cyclones, such as those at tropical storm intensity or less. In a tropical storm, a broader region of swirling updraft (albeit slower swirling), with heavy precipitation and deep cloudiness, occupies the entire core of the vortex, right to the axis of rotation. Without an eye, an outer boundary to the convective core still exists. Herein lies the explanation why the (less accessible) outer boundary of the eyewall is not expected to be a sensitive indicator of changes in vortex intensity.

Also, the eye 124 and the eyewall 126 may appear, then disappear, then reappear over the lifespan of a tropical cyclone. Thus, it is convenient to refer to a core of a tropical cyclone—the core being the central portion of the vortex, which includes the eye 124 and the eyewall 126 in a sufficiently intense vortex (a hurricane), and which does not include an eye/eyewall for a vortex that is less intense. Whatever the apparently internal thermo fluid-dynamic mechanism(s) that result(s) in about half of tropical storms, but only about half, undergoing transition to a higher intensity configuration, namely, a hurricane, or about half of hurricanes, but only about half, to major hurricanes, the observationally accessible manifestation of those transitions is change in core structure. Such significant changes may occur over the time scale of the inverse Coriolis frequency, which is an inherent time scale of the vortex. Hence the designation of the swiftest fraction of such transitions as "rapid intensification" seems moot, because such characterization overlooks evident time scales for the system, and effectively the same physical processes enter whether the occurrence of the transition is or is not quasi-steady.

With the above as background, a technique is thus proposed which monitors the core of the hurricane 100 (and/or its tropical storm predecessor/successor) for indications of strengthening or weakening. One key factor is whether or not an eye enveloped by an eyewall is present, and if so, how fully inserted. The interface of the eye 124 with the eyewall 126 may not extend all the way down to the ocean surface 110. In fact, when the eye 124 just begins to form, it exists only at the upper elevations of the hurricane 100. Therefore, structural parameters of the vortex that ought to be measured include the altitude of the top of the eyewall 126 (which may include some vertical overshoot above the top of the cirrus-cloud deck), and the altitude of the bottom of the eye 124 (which may be well above sea level in a tropical cyclone that is not fully developed into a major hurricane).

In addition to the altitude of the top and bottom of the eye 124, the diameter of the eye 124 as a function of altitude is also significant. The diameter of the eye 124 is considered to be effectively the same as the diameter of an inner boundary of the eyewall 126. If the eye 124 extends all the way down to the ocean surface 110, that in itself is a significant, readily accessible observable; moreover, the diameter of the eye 124 at the ocean surface 110 is a convenient indicator of intensity for a given vortex. Furthermore, the change in eye diameter with increasing altitude is also very important for self-consistency of the underlying concepts. As discussed above, since if the eyewall 126 has a greater diameter at the top than at the bottom, and particularly since the eyewall 126 curves discernibly outward at higher altitudes as shown in FIG. 3 (the "stadium effect"), this supports a larger pressure deficit than otherwise would occur in the eyewall 126 at the ocean surface 110, and a greater vortex intensity. Therefore, much can be learned (and confirmed) from the shape of the eyewall 126 from bottom to top, including the altitude of its bottom, the altitude of its top, and its diameter at several altitudes from bottom to top.

In addition to the core structural parameters (relating to the presence and detailed shape of the eye 124 and the eyewall 126) discussed above, the aircraft 12 can use the onboard sensors to measure many significant meteorological conditions in the core of the hurricane 100. These conditions include air temperature, pressure and humidity in the eye 124. For a partially inserted eye that does not extend downward all the distance to the ocean surface 110, moist boundary layer air underruns the compressionally-heated dry air in the eye. As a consequence, there is a detectable inversion layer, in which the temperature increases with altitude, at the base of a partially inserted eye. The underrunning moist air eventually joins the rest of the boundary layer air and becomes part of the eyewall 126. Not just the minimum pressure in the eye 124 near the ocean surface 110, but the change in pressure with altitude, is significant.

The significant meteorological conditions further include the vertical velocity component in the eyewall 126, and the rotational velocity component in the eyewall 126. The rotational velocity and the vertical velocity vary with altitude and radial position in the eyewall 126. In general, because the eyewall is continually supplied at its base with fluid from the separating near-ocean surface boundary layer, the flow in the eyewall upflux and lateral outflow would be expected to have: faster along-streamline motion, lower swirling, and higher total stagnation enthalpy near its inner boundary; and slower along-streamline motion, higher swirl, and lower total stagnation enthalpy near its outer boundary. Thus air ascending in the eyewall 126 on different moist-pseudo-adiabatic loci achieves equilibrium at different altitudes. Aside from localized shear-induced mixing, the upper tropospheric outflow tends to be stably stratified, and consistent with remerging with tropical ambients in which tropical cyclones arise.

The core structural parameters (eye/eyewall shape data) and the other significant meteorological conditions can be determined by a combination of sensors onboard the aircraft 12. For example, the camera 32 can take images which show if the eye 124 extends all the way down to the ocean surface 110, and also, knowing the altitude of flight of the aircraft 12, determine the diameter of the eye 124 at its bottom. Also, by imaging the hurricane 100 from various positions above and offset from the eye 124, the images from the camera 32 can reveal the cross-sectional shape of the eyewall 126—which may be locally cylindrical, conical or strongly outwardly-curving as in FIG. 3.

The radar detector 42 can be used for detecting hydrometeors (particles of liquid and/or solid water substance in the air) from which may be inferred variations in air mass movement, such as wind direction and speed, especially in the eyewall 126. Thus, the radar detector 42 can provide an accurate representation of the shape and the thickness of the eyewall 126 at various altitudes (enough different altitudes to discern the shape profile of the eyewall 126). The radar detector 42 can also provide measurements of the velocity of the eyewall updraft 130, and velocity of the tangential winds in the eyewall 126.

Accurate measurement of meteorological conditions from the top of the hurricane to its bottom can be achieved using deployable sensors 38 deployed from an overflying HALE UAV 12 such as the Global Hawk. As dropsondes, the deployable sensors 38 measure parameters such as air temperature, pressure and humidity as the dropsondes descend from the aircraft 12 to the ocean surface 110, and report the measured data back to the aircraft 12. The dropsondes may be fitted with a parachute for a slow descent, or with bomb-like tailfins for a quicker, straighter descent through the eye 124. Constant-altitude balloons can measure meteorological conditions over extended time periods at particular altitudes within the eye 124, thus providing a very accurate representation of how conditions are changing.

The infrared detector 34 can detect changes in air temperature with altitude in relatively cloud-free portions of the hurricane 100 such as the eye 124. Typically with coarser spatial resolutions, the passive microwave sensors 44 can be used for detecting temperature and humidity profiles within the core of the tropical cyclone, regardless of whether the eye 124 and the eyewall 126 are present.

To summarize the above discussion—the aircraft 12 is flown at an altitude above the hurricane 100 in a suitable pattern to repeatedly overfly the core of the hurricane 100. Measurement data are taken which provide an accurate depiction of the current status of the core—including detailed eye/eyewall data if present. The measurement data are continuously transmitted to a tropical cyclone forecast center, typically via a relay satellite or other craft. By comparing the measurement data to corresponding data from a previous time sample—such as an hour prior, for example—a timely determination can be made as to the strengthening or weakening of the hurricane 100.

For example, if a tropical storm lacking an eye develops a nascent eye within an eyewall, even if only a shallow eye at the top of the storm's altitude, this is an indication of intensification. Likewise, if the eye 124 has deepened since the previous measurement time (has a lower bottom altitude), then the storm is intensifying. In this way, any development of the eye 124 and the eyewall 126 to a more pronounced structure—including deepening of the eye 124 to or toward the ocean surface 110—is an indication of intensification.

Additionally, if the eyewall 126 has flared farther outward at the top since the previous measurement time (has a larger top diameter), this condition supports a greater pressure deficit at the bottom of the eyewall 126 and indicates an intensification of the vortex. Many such conclusions can be drawn from the shape and size of the eye 124 and the eyewall 126. The reverse of the above logic is also true; for example, if the eye 124 becomes more shallow from one time sample to the next, then the storm is weakening.

One key capability of the disclosed methods for high-altitude long-endurance UAV-enabled hurricane monitoring is the early (real-time) detection of incipient formation of an eye within a tropical storm, the occurrence of which marks the transition from a less intense tropical storm to a more intense hurricane. NOAA staff and others have made scores and scores of reconnaissance missions at about 3 km above sea level into tropical cyclones, and virtually none claim ever to have witnessed in real time this crucial, practically important transition in the core from so-called one-cell structure to so-called two-cell structure. There is no question that this transition is exceptionally rapid and is initiated at the top of the vortex, so the continuous overview provided by the Global Hawk is indispensable.

The penetration of the vortex below 5000 ft, as others have suggested, is far too low an altitude to afford the opportunity to witness the formation of the eye. Indeed, it was the mistaken impression of Robert Simpson, looking upward at purported verticality of the eye/eyewall interface from such a low altitude during a reconnaissance flight, that set tropical-cyclone science on a wrong path for about three-quarters of a century (and counting) concerning the operative physical mechanism for major intensification. To summarize with emphasis—only the continuous monitoring of a tropical storm from above affords the opportunity to witness in real time the nascent formation of an eye, and this event can be communicated to weather forecasting stations as a real-time indication of storm intensification—i.e., the transition from a tropical storm to a hurricane. The Global Hawk UAV aircraft 12 provides the necessary capability, due to its high-altitude and long-endurance flight capability, and its ability to remain in visual/sensor contact with the center of the storm (from above) at all times during its flight mission.

In addition to the intensification clues offered by the shape and size of the eye 124 and the eyewall 126 discussed above, measured meteorological conditions within the eye 124 and in the eyewall 126 can provide an indication of a storm's intensification or weakening. For example, using the deployable sensors 38, the barometric pressure at various heights down through the eye 124 can be measured, including the pressure at sea level which is often used as an alternate, less fluctuating indication of vortex intensity. Air temperature can also be measured by the deployable sensors 38 through the eye 124 from top to bottom. An increased temperature near the bottom of the eye 124 from one time sample to the next is an indication that compressional heating of the air in the eye 124 has increased, for example, because the vertical extent of the eye has lengthened or the eye has dried out, and further vortex intensification may follow. Measurements can be made rapidly from the top of the eye 124 to the bottom, or over time at particular altitudes.

The Global Hawk aircraft is capable of carrying nearly 100 of the deployable sensors 38 of the dropsonde variety, which is enough to deploy 3-4 of the deployable sensors 38 every hour for the entire time the aircraft 12 is on site at the hurricane 100, if this is preferred deployment option of the operator. Many intensification indications such as those discussed above can be detected from sensor measurements in the core of the storm, particularly in the eye 124 if it exists, where these measurements can be taken by the deployable sensors 38 or the other instruments onboard the aircraft 12, such as the infrared detector 34 or the microwave sensor 44.

Figure 4:
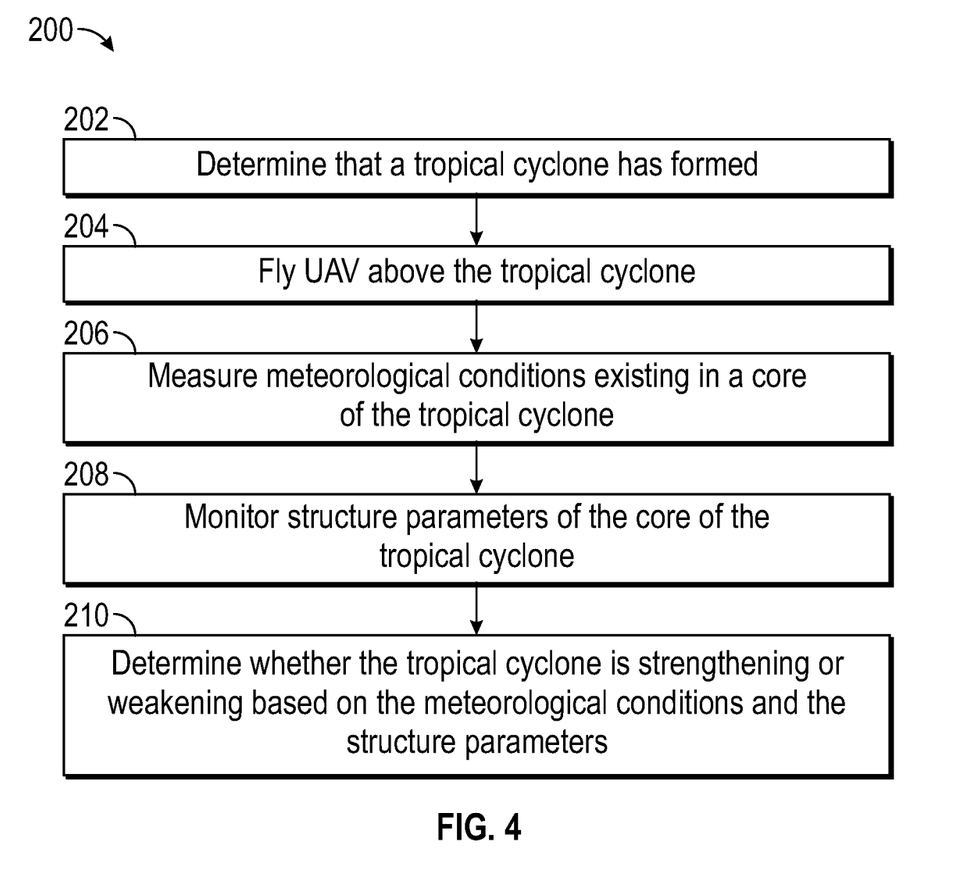
FIG. 4 is a flowchart diagram of a method for monitoring of intensity and intensity trend of a tropical cyclone, according to an embodiment of the present disclosure.

FIG. 4 is a flowchart diagram 200 of a method for monitoring intensification of a tropical cyclone, according to an embodiment of the present disclosure. At box 202, it is determined that a tropical cyclone has formed, most commonly from operational geosynchronous and sun-synchronous satellite constellations, but also from a wide range of research and special-purpose meteorological satellites. Although the UAV aircraft 12 can be used to monitor any tropical system, it may be advantageous to deploy the aircraft 12 only to tropical cyclones which have intensified to at least tropical-depression, if not tropical-storm, category. A large fraction of tropical disturbances never reach even tropical-depression strength, and detailed monitoring of a weak tropical disturbance, which typically poses relatively minor threat to life or property, is not an optimal use of finite operational assets.

At box 204, the UAV aircraft 12 is flown above the tropical cyclone. The aircraft 12, if a Global Hawk, has a flight endurance of 30 hours or more. Given the high flight speed of the Global Hawk which enables rapid arrival on target at the tropical cyclone, which may be a hurricane, the long flight endurance equates to a time on site of 20 hours or more. These features allow a tropical cyclone which persists for days or even weeks to be continuously monitored by just two of the Global Hawks, where there is ample time to refuel, perform maintenance, restock, and reprogram one unit while the other unit is in flight.

At box 206, meteorological conditions existing in a core of the tropical cyclone are measured using sensors onboard the UAV aircraft 12. As discussed above, the meteorological conditions include air temperature, air pressure, humidity, presence of hydrometeors, wind speed and direction, etc., and the measurements are taken by the deployable sensors 38 (dropsondes or constant-altitude balloons) or the other instruments onboard the aircraft 12, such as the infrared detector 34 or the microwave sensor 44.

At box 208, structure parameters of the core of the tropical cyclone are detected using the sensors on the UAV aircraft 12, such as the camera 32 and the radar detector 42. The structure parameters particularly include the presence or absence of an eye 124 enveloped by an eyewall 126 and, if they are present, the details of their size and shape as discussed above. The detection of structure parameters at the box 208 includes the continuous monitoring of the core of the storm to detect the nascent formation of an eye in real time.

At box 210, it is determined whether the tropical cyclone is strengthening or weakening based on the meteorological conditions in the core and the structure parameters. In a preferred embodiment, the data collected by the UAV aircraft 12—including the meteorological conditions existing in the core and the structure parameters of the core—are transmitted from the UAV aircraft 12 to a forecast center, usually including transmitting the data from the UAV aircraft 12 to an intermediate vehicle such as a satellite, other aircraft or ship, which relays the data to the forecast center. Also, comparison of the meteorological conditions and the structure parameters from a current sample to corresponding data from a previous sample time yields a clear indication of vortex strengthening or weakening, or persistence as is, as discussed above. Furthermore, the determination of strengthening or weakening at the box 210 includes the real-time detection of the formation of a nascent eye where none existed previously (strengthening) or conversely, the real-time detection of the disappearance of an eye where one existed previously (weakening). The determination of strengthening or weakening at the box 210 can be performed by software running on the processor 58 in the aircraft 12, by software running on a computer at the receiving station 50, or by personnel or software at a storm forecast center which receives the data from the aircraft 12.

Of course, the whole purpose of monitoring tropical cyclones for signs of intensification or weakening is to enable adequate accurate warnings to the public of an approaching dangerous vortex, and begin deployment of equipment and human resources to areas expected to be hard hit, etc. These objectives can be more effectively met by using the techniques discussed above, including deploying the Global Hawk aircraft 12 for long-endurance overflight monitoring of the tropical cyclone and measuring and analyzing properties of the vortex which have not been examined in traditional "hurricane hunting" missions. Deployment of a system with the capabilities of a Global Hawk incurs considerable cost, and, for many environmental-monitoring objectives, less expensive alternatives often suffice. However, for the recurrent, high impact (multi-billion-dollar-loss-inflicting), randomly occurring, rapidly evolving natural hazards of tropical cyclones, a specific mission plan has been delineated that supports operational deployment.

In earlier discussion related to the radar detector 42 on the aircraft 12, reference was made to strongly convective "bursts" whose tops could overshoot the equilibrium altitude for saturated air ascending in the eyewall. These vigorous cumulonimbi have air at the center of the rising column that ascends with little dilution by mixing with surrounding air. The tropical tropopause lies at noteworthy altitude, so such overshooting motivates caution where overflying intense vortices. Global Hawks are being equipped with sense-and-avoid systems to detect hazards along their flight paths in cruise.

The focus of the preceding discussion has been on operational UAV missions to support forecasting of tropical-cyclones intensity in real time. Moreover, the emphasis has been on monitoring of the vortex core from an overview perspective. Nevertheless, these missions also afford the opportunity for support of research on tropical cyclone thermo-fluid-dynamics, including research on portions of the vortex outside the core. In particular, Global Hawk overflights permit measurements of properties of the upper-tropospheric outflow, and discharge to the ambient, of the throughput. This is noteworthy because the outflow is often characterized as the least probed portion of the generic structure. The Global Hawk allows dispensing of dropsondes from exceptional altitude. While, for an intense vortex, dropsondes furnish instantaneous sampling at any site of a turbulent, fluctuating flow, the level of atmospheric turbulence generally decreases with altitude.

Throughout the preceding discussion, various computers, processors and controllers are described and implied. It is to be understood that the methods which are encoded as software applications and modules of these computers and controllers are executed on one or more computing devices having a processor and a memory module. In particular, this includes the processor 58 in the UAV aircraft 12, the remote controller 56 in the receiving station 50, and a controller or computer with a processor in each of the satellite 46, the sea vessel 48 and the other aircraft 52 discussed above. Other computers and processors are similarly employed at weather forecasting stations which receive data from the UAV aircraft 12.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for monitoring intensification of a tropical cyclone, said method comprising:
   determining that the tropical cyclone with a core has formed;
   flying an unmanned aerial vehicle (UAV) above the tropical cyclone;
   measuring, using sensors onboard the UAV, meteorological conditions existing in the core of the tropical cyclone;
   detecting, using the sensors, structure parameters of the core of the tropical cyclone, including detecting in real time a nascent formation of an eye at a top of the core of the tropical cyclone, detecting a presence of an eye within an eyewall and, when the eye and the eyewall are present, determining eye data including an altitude of a bottom of the eye, an altitude of a top of the eye, and diameters of the eye at a plurality of locations from the bottom to the top; and determining whether the tropical cyclone is strengthening or weakening based on the meteorological conditions and the structure parameters, including determining in real time that the tropical cyclone is strengthening when the nascent formation of the eye is detected.

2. The method according to claim 1 wherein flying a UAV above the tropical cyclone includes flying the UAV at an altitude which is above a top of the tropical cyclone and below any overlying clouds and in a flight pattern which allows continuous sensor monitoring of the core of the tropical cyclone.

3. The method according to claim 1 further comprising comparing the presence of the eye and the eyewall, and the eye data, to corresponding data from a previous sample time.

4. The method according to claim 3 wherein determining whether the tropical cyclone is strengthening or weakening includes determining that the tropical cyclone is strengthening if the eye has a difference in top-to-bottom altitude which has increased since the previous time sample, the eye has a difference between a top diameter and a bottom diameter which has increased since the previous sample time, or the eyewall has a slope near the top which has become more horizontal since the previous sample time.

5. The method according to claim 1 wherein measuring meteorological conditions existing in a core of the tropical cyclone includes using the sensors to measure meteorological condition data including air temperature, air pressure, humidity and horizontal and vertical winds at a plurality of heights within an eye and an eyewall of the tropical cyclone when the eye and the eyewall exist.

6. The method according to claim 5 further comprising comparing the meteorological condition data to corresponding data from a previous sample time.

7. The method according to claim 6 wherein determining whether the tropical cyclone is strengthening or weakening includes determining that the tropical cyclone is strengthening if the air temperature at the bottom of the eye has increased since the previous sample time, the air pressure at the bottom of the eye has decreased since the previous sample time, or a maximum updraft velocity in the eyewall has increased since the previous sample time.

8. The method according to claim 1 wherein the sensors onboard the UAV include a radar detector, an imaging camera, an infrared sensor, a passive microwave detector and one or more deployable sensors that measure temperature, pressure, relative humidity, and wind speed and direction within the tropical cyclone and send remote measurement data back to the UAV.

9. The method according to claim 8 wherein the deployable sensors include dropsondes which measure the remote measurement data while descending to an ocean surface, or constant-altitude balloons which measure the remote measurement data while maintaining a constant altitude within the eye of the tropical cyclone, or both.

10. The method according to claim 1 further comprising transmitting the meteorological conditions and the structure parameters from the UAV to a satellite, an aircraft or a ship for relaying to a storm forecast center.

11. The method according to claim 1 wherein the UAV is a Global Hawk.

12. The method according to claim 1 further comprising periodically receiving, by the UAV using a configurable processor and a communications system, updated mission instructions from a ground-based remote controller, where the updated mission instructions include a revised definition of flight path and altitude, and instructions regarding sensor measurements to take and deployment of dropsonde sensors.

13. The method according to claim 12 further comprising continuing monitoring the tropical cyclone, by the UAV, for a period of at least 20 hours before being replaced by a second UAV, where the UAV and the second UAV provide continuous monitoring of the tropical cyclone for an entire lifespan of the tropical cyclone.

14. A method for monitoring intensification of a tropical cyclone, said method comprising:

determining that the tropical cyclone with a core has formed;

flying a Global Hawk unmanned aerial vehicle (UAV) above the tropical cyclone;

measuring, using sensors onboard the Global Hawk UAV, meteorological conditions existing in the core of the tropical cyclone, where the sensors include a radar detector, an imaging camera, an infrared sensor, a passive microwave detector and a plurality of deployable sensors that measure temperature, pressure, relative humidity and wind direction within the tropical cyclone and send remote measurement data back to the Global Hawk UAV;

detecting, using the sensors, structure parameters of the core of the tropical cyclone including detecting in real time a nascent formation of an eye at a top of the core of the tropical cyclone, detecting a presence of an eye within an eyewall and, when the eye and the eyewall are present, determining eye data including an altitude of a bottom of the eye, an altitude of a top of the eye, and diameters of the eye at a plurality of locations from the bottom to the top;

transmitting the meteorological conditions and the structure parameters from the Global Hawk UAV to a satellite, an aircraft or a ship for relaying to a storm forecast center;

determining whether the tropical cyclone is strengthening or weakening based on the meteorological conditions and the structure parameters, including determining in real time that the tropical cyclone is strengthening when the nascent formation of the eye is detected, determining that the tropical cyclone is strengthening if the eye has a difference in top-to-bottom altitude which has increased since the previous sample time, the eye has a difference between a top diameter and a bottom diameter which has increased since the previous sample time, or the eyewall has a slope near the top which has become more horizontal since the previous sample time; and periodically receiving and following, by the Global Hawk UAV using a configurable processor and a communications system, updated mission instructions from a ground-based remote controller, where the updated mission instructions include a revised definition of flight path and altitude, and instructions regarding sensor measurements to take and deployment of dropsonde sensors.

15. The method according to claim 14 wherein flying a Global Hawk UAV above the tropical cyclone includes flying the Global Hawk UAV at an altitude which is above a top of the tropical cyclone and below any overlying clouds and in a flight pattern which allows continuous sensor monitoring of the core of the tropical cyclone.

16. A method for monitoring intensification of a tropical cyclone, said method comprising flying an unmanned aerial vehicle (UAV) above the tropical cyclone, measuring structure parameters of a core of the tropical cyclone using sensors onboard the UAV, determining in real time that the tropical cyclone has strengthened to a hurricane when a nascent formation of an eye is detected at a top of the core of the tropical cyclone, and determining that the tropical cyclone is intensifying based on changes in the structure parameters, where the changes in the structure parameters include formation of an eye within an eyewall, an increase in a vertical height of the eye, and an increase in a difference between a top diameter and a bottom diameter of the eye.

17. The method according to claim 16 wherein the sensors onboard the UAV include a radar detector, an imaging camera, an infrared sensor, a passive microwave detector and one or more deployable sensors that measure temperature, pressure, relative humidity and wind direction within the tropical cyclone and send remote measurement data back to the UAV, where the deployable sensors include dropsondes, constant-altitude balloons, or both.

18. The method according to claim 17 further comprising periodically receiving and following, by the UAV using a configurable processor and a communications system, updated mission instructions from a ground-based remote controller, where the updated mission instructions include a revised definition of flight path and altitude, and instructions regarding sensor measurements to take and release of the deployable sensors.

19. The method according to claim 16 further comprising transmitting the structure parameters from the UAV to a satellite, an aircraft or a ship for relaying to a storm forecast center.

20. The method according to claim 16 wherein the UAV is a Global Hawk.

* * * * *